US010317134B2

(12) United States Patent
Pandeya et al.

(10) Patent No.: US 10,317,134 B2
(45) Date of Patent: Jun. 11, 2019

(54) RAPID COOLING SYSTEMS FOR BEVERAGES

(71) Applicant: Cornelius, Inc., St. Paul, MN (US)

(72) Inventors: Mridul Kumar Pandeya, Uttarakhand (IN); Sandip Chougale, Kolhapur (IN); Basavraj Sankhgond, Maharashtra (IN); Jeffrey L. Garascia, Dublin, OH (US)

(73) Assignee: Cornelius, Inc., Osseo, MN (US)

( * ) Notice: Subject to any disclaimer, the term of this patent is extended or adjusted under 35 U.S.C. 154(b) by 124 days.

(21) Appl. No.: 15/198,926

(22) Filed: Jun. 30, 2016

(65) Prior Publication Data

US 2017/0292781 A1 Oct. 12, 2017

(30) Foreign Application Priority Data

Apr. 12, 2016 (IN) ............................ 2016/21012753

(51) Int. Cl.
*A47J 31/40* (2006.01)
*F25D 31/00* (2006.01)
(Continued)

(52) U.S. Cl.
CPC ......... *F25D 31/002* (2013.01); *B67D 1/0857* (2013.01); *F25D 3/005* (2013.01);
(Continued)

(58) Field of Classification Search
CPC ................... F25D 31/002; F25D 3/005; F25D 2303/0843; B67D 1/0857; B67D 1/0859;
(Continued)

(56) References Cited

U.S. PATENT DOCUMENTS 4,494,600 A 1/1985 DeLau
5,537,838 A 7/1996 Mills et al.
(Continued)

FOREIGN PATENT DOCUMENTS

CA 2874389 A1 12/2012
IN 10366/DELNP/2013 12/2014
(Continued)

OTHER PUBLICATIONS

Pending Indian Patent Application entitled "Rapid Cooling Systems for Hot Beverages", filed Apr. 12, 2016, Pandeya et al.
(Continued)

*Primary Examiner* — Keith M Raymond
*Assistant Examiner* — Nael N Babaa
(74) *Attorney, Agent, or Firm* — Andrus Intellectual Property Law, LLP

(57) ABSTRACT

A cooling system for rapidly cooling a beverage comprises a cooling channel configured to convey a beverage from upstream to downstream and a nozzle. The cooling channel includes an inner peripheral surface and the nozzle sprays the beverage on the inner peripheral surface such that the beverage is conveyed by gravity along the inner peripheral surface. The beverage cools as the beverage is conveyed by gravity along the inner peripheral surface such that the beverage is cooled by condensation and convection. The nozzle is further configured to reduce the pressure of the beverage such that the beverage cools due to expansion and reduction of pressure. The cooling system can also include a cooling media circulation system, a cooling media refrigeration system, and a post-chill coil.

19 Claims, 10 Drawing Sheets

(51) Int. Cl.
*F25D 16/00* (2006.01)
*F25D 3/00* (2006.01)
*B67D 1/08* (2006.01)

(52) U.S. Cl.
CPC ............ *F25D 16/00* (2013.01); *B67D 1/0859* (2013.01); *B67D 1/0861* (2013.01); *B67D 1/0862* (2013.01); *B67D 1/0864* (2013.01); *B67D 2210/00104* (2013.01); *F25D 2303/0843* (2013.01); *F25D 2700/10* (2013.01)

(58) Field of Classification Search
CPC ................ B67D 1/0861; B67D 1/0864; B67D 2210/00104
See application file for complete search history.

(56) References Cited

U.S. PATENT DOCUMENTS 6,199,386 B1 3/2001 Garrett et al.
9,222,714 B2 12/2015 Zebuhr et al.
2011/0041543 A1 2/2011 Tachibana et al.
2011/0042414 A1* 2/2011 Tachibana ................. A23L 2/54 222/129.1
2011/0045152 A1 2/2011 Stutz et al.
2012/0312521 A1 12/2012 Lebuhr et al.
2013/0160975 A1* 6/2013 Stautner ............. G01R 33/3804 165/104.22
2014/0070025 A1* 3/2014 Dalbo ................... B05B 1/3421 239/337
2015/0034658 A1 2/2015 Vastardis

FOREIGN PATENT DOCUMENTS

WO 2006/047860 5/2006
WO 2012170115 A1 12/2012

OTHER PUBLICATIONS

International Search Report and Written Opinion, PCT/US2017/013139, dated Apr. 3, 2017.

* cited by examiner

RAPID COOLING SYSTEMS FOR BEVERAGES

CROSS REFERENCE TO RELATED APPLICATION

The present application claims priority to and the benefit of Indian Patent Application No. 2016/21012753 filed on Apr. 11, 2016, which is incorporated herein by reference.

FIELD

The present disclosure relates to rapid cooling systems for beverages and components thereof, specifically, systems that rapidly cool hot brewed beverages.

BACKGROUND

The following patents and applications are incorporated herein by reference in their entirety:

U.S. patent application Ser. No. 14/448,218 discloses a beverage chiller that can rapidly cool beverages without the need for ice, and a device for mixing beverages, i.e., a cocktail shaker, that does not require a cap. The beverage chiller cools a beverage or beverage stream in a continuous, or nearly continuous manner, for example, the output of a coffee or tea brewing machine.

U.S. patent application Ser. No. 12/736,700 discloses a method of producing a drink, a cold drink, in particular iced coffee is produced from a hot drink, in particular a coffee/espresso, which is produced in a drinks machine by means of a hot-drinks-preparing device.

Indian Patent Application No. 10366/DELNP/2013 discloses fluid cooling apparatus includes a first cooling portion have a first series of cooling elements with first cooling surfaces. A second cooling portion has a second series of cooling elements with second cooling surfaces. The second cooling portion can be removably nested together with the first cooling portion such that the first and second cooling surfaces of respective first and second series of cooling elements can be positioned adjacent to each other with gaps there between to form cooling cavities for cooling fluid introduced into the cooling cavities.

SUMMARY

This Summary is provided to introduce a selection of concepts that are further described herein in the Detailed Description. This Summary is not intended to identify key or essential features of the claimed subject matter, nor is it intended to be used as an aid in limiting the scope of the claimed subject matter.

In certain examples, a cooling system for rapidly cooling a beverage includes a cooling channel and a nozzle. The cooling channel includes an inner peripheral surface, an upstream inlet, and a downstream outlet. The cooling channel is configured to convey a beverage from upstream to downstream. The nozzle is configured to spray the beverage onto the inner peripheral surface of the cooling channel such that the beverage is conveyed by gravity along the inner peripheral surface such that the beverage is cooled by condensation and convection.

In certain examples, a method of rapidly cooling a beverage includes supplying the beverage to a cooling channel having an inner peripheral surface; spraying the beverage through a nozzle onto the inner peripheral surface of the cooling channel, wherein the nozzle is configured to reduce the pressure of the beverage such that the beverage is cooled as the beverage pressure is reduced; and conveying the beverage by gravity along the inner peripheral surface to cooling channels such that the beverage is cooled by condensation and convection.

BRIEF DESCRIPTION OF THE DRAWINGS

Examples of systems for rapidly cooling beverages are described with reference to the following drawing Figures. The same numbers are used throughout the Figures to reference like features and components.

DETAILED DESCRIPTION

In the present disclosure, certain terms are used for brevity, clearness and understanding. No unnecessary limitations are to be implied therefrom beyond the requirement of the prior art because such terms are used for descriptive purposes only and are intended to be broadly construed. The different systems described herein may be used alone or in combination with other systems. Various equivalents, alternatives and modifications are possible within the scope of the appended claims.

The present disclosure is described herein using several definitions, as set forth below and throughout the application. Unless otherwise specified or indicated by context, the terms "a", "an", and "the" mean "one or more." For example, "a compound" should be interpreted to mean "one or more compounds." As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

During research and development, the present inventors have determined that it is desirable to provide systems for rapidly cooling beverages. More particularly, the present inventors have found that it is desirable to provide systems for rapidly cooling hot brewed beverages (e.g. hot tea and coffee) by conveying the hot brewed beverages through a cooling channel and a nozzle such that the beverage cools by expansion, condensation, and convection. Through research and experimentation, the present inventors conceived of the concepts in the present disclosure. Various alternative concepts will become apparent from the following non-limiting description and drawings.

Figure 1:
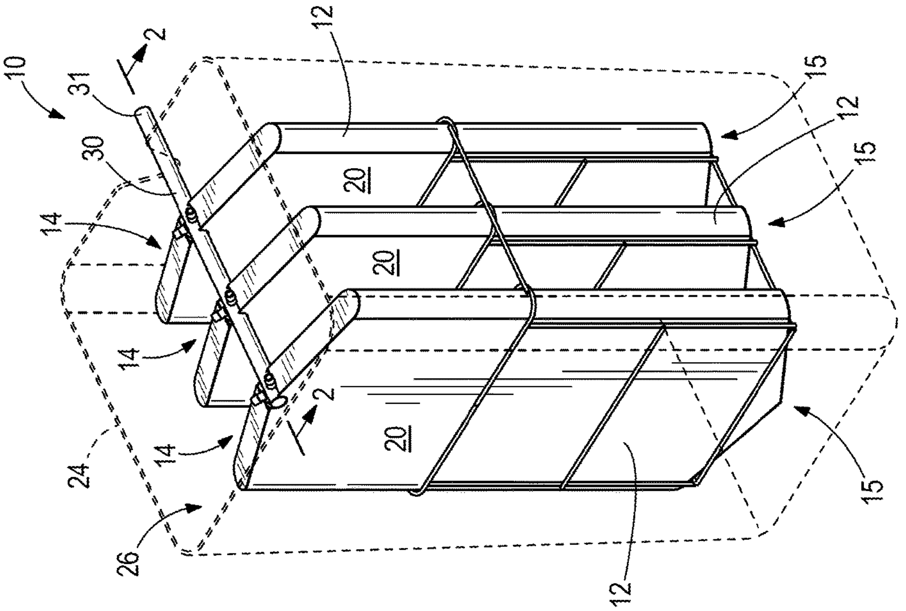
FIG. 1 is an example of a cooling system.
Figure 2:
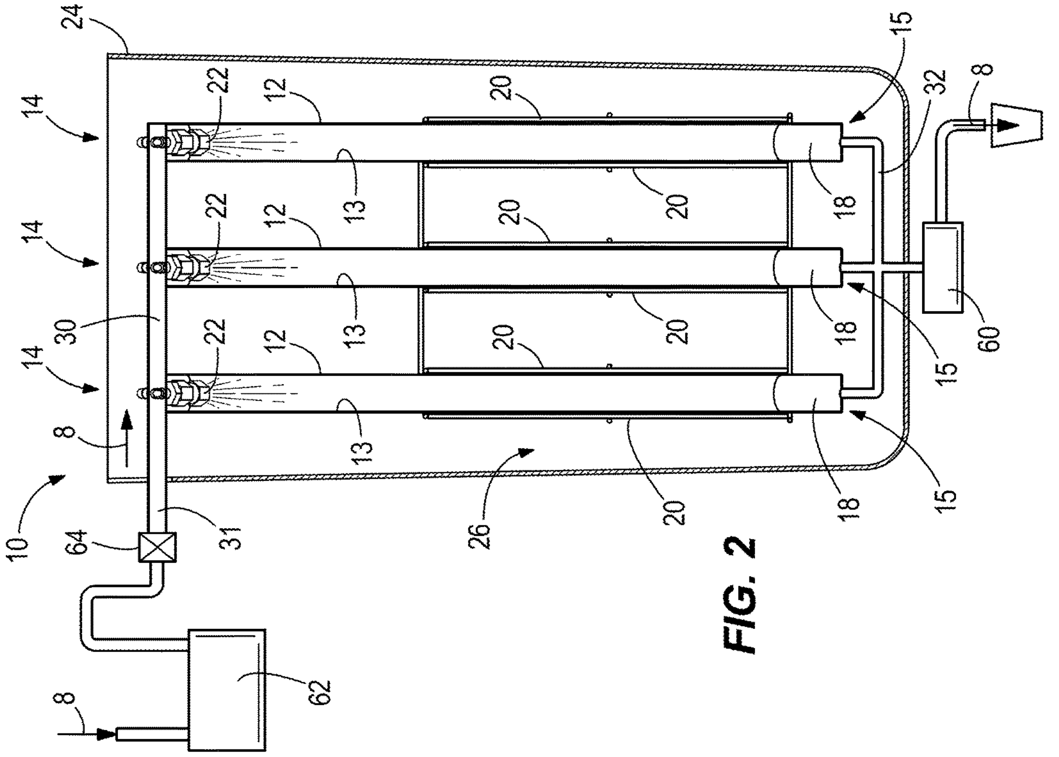
FIG. 2 is a cross-section of the cooling system along 2-2 of FIG. 1.

FIGS. 1-2 depict an example cooling system 10 for rapidly cooling a beverage 8 (refer to flow arrows of the beverage 8). The cooling system 10 includes a plurality of cooling channels 12 configured to convey the beverage 8 from upstream to downstream. The cooling channels 12 include an inner peripheral surface 13, an upstream inlet 14 configured to receive the beverage 8, a downstream outlet 15 configured to dispense the beverage 8, and a lower surface 18 configured to convey the beverage 8 by gravity from the inner peripheral surface 13 to the downstream outlet 15. Each cooling channel 12 includes a pair of opposing parallel sides 20. The number of cooling channels 12 depicted is merely exemplary and can vary from that which is shown. In some examples, the cooling system 10 includes three cooling channels 12 (see FIGS. 1-4). In other examples, the cooling system 10 includes four cooling channels 12 (see FIGS. 5-6). The size and shape of the cooling channel 12 can vary from that which is shown. In one example, the cooling channel 12 is a cylinder (see FIG. 6). In other examples, the cooling channel 12 is a double-walled cylinder (see FIGS. 11-15) including a first inner peripheral surface 151, a second inner peripheral surface 152, a lower surface 153 coupling the first inner peripheral surface 151 to the second inner peripheral surface 152, an upper surface 155, and a downstream outlet 154.

The cooling system 10 includes a nozzle 22 that is configured to spray the beverage 8 onto the inner peripheral surface 13 of the cooling channel 12 such that the beverage 8 is conveyed by gravity along the inner peripheral surface 13 and cooled by condensation and convection. The nozzle 22 is configured to reduce the pressure of the beverage 8 such that the beverage 8 expands and cools. In some examples, the nozzle 22 is an atomizing nozzle configured to atomize the beverage 8. The nozzle 22 can be one of a plurality of nozzles 22 included with the cooling system 10. The plurality of nozzles 22 are configured to spray the beverage 8 onto the inner peripheral surface 13 of each cooling channel 12. The number of nozzles 22 included with the cooling system 10 can correspond with the number of cooling channels 12. In certain examples, two nozzles 22 are included with each cooling channel 12 (e.g. the example shown in FIGS. 1-2 has three cooling channels 12 and six nozzles 22(note that three of the nozzles 22 are not visible)). The number of cooling channels 12 and/or nozzles 22 depicted is merely exemplary and can vary from that which is shown. Referring to the example double-wall cooling channel 12 depicted in FIG. 15, the nozzle 22 is configured to spray the beverage 8 onto the first and second inner peripheral surfaces 151, 152 of a double-wall cooling channel 12 (as depicted in FIGS. 11-14 and described above) such that the beverage 8 is conveyed by gravity along the upper surface 155 and the first and second inner peripheral surfaces 151, 152 and cooled by condensation and convection.

The cooling system 10 includes a tank 24 configured to contain a cooling media 26. Each of the plurality of cooling channels 12 are located in the tank 24 such that the cooling media 26 cools the cooling channel 12 (FIG. 1 depicts the tank 24 in dashed lines). The type of cooling media 26 utilized to cool the cooling channel 12 can vary and for example can include water, refrigerant, ice, water-ice slurry, and/or the like.

The cooling system 10 includes an inlet manifold 30 that is coupled to each of the plurality of cooling channels 12 such that the inlet manifold 30 conveys the beverage 8 to each of the plurality of cooling channels 12 and/or nozzles 22. The inlet manifold 30 has an upstream end 31 configured to receive the beverage 8. The cooling system 10 includes an outlet manifold 32 that is coupled to each of the plurality of cooling channels 12 such that the outlet manifold 32 collects the beverage 8 from each of the plurality of cooling channels 12.

Figure 3:
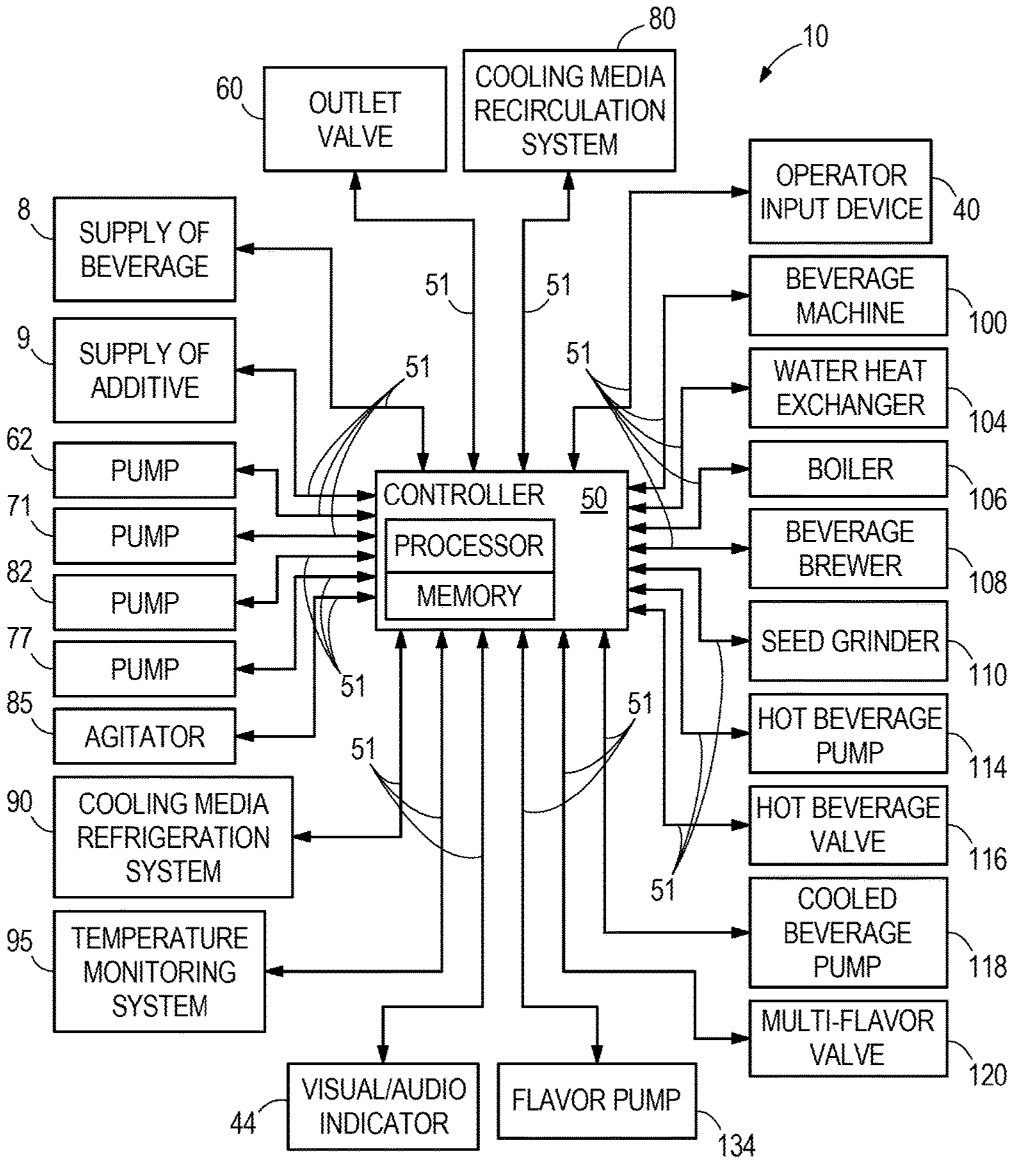
FIG. 3 is an example system diagram for an example cooling system.

Referring to FIG. 3, the cooling system 10 includes an operator input device 40 and a computer controller 50. The type and configuration of operator input device 40 and controller 50 can vary from that which is shown. The operator input device 40 can include one or more conventional input devices for inputting operator selections of beverage 8 and/or additives 9 (further described herein below with reference to FIG. 10) to the controller 50. Exemplary operator input devices 40 include touch screens, mechanical buttons, mechanical switches, voice command receivers, tactile command receivers, gesture sensing devices, and/or remove controllers such as personal digital assistant(s) (PDAs), handheld(s), laptop computer(s), and/or the like.

Referring to FIG. 3, the controller 50 is configured to control the operator input device 40, the supply of beverage 8, at least one supply of additive 9, and pumps 62, 71, 82, outlet valves 35 and/or other devices associated therewith for supplying selected beverage 8 and additive(s) 9 in accordance with inputs to the operator input device 40. The controller 50 can be on the cooling system 10 and/or can be located remotely from the cooling system 10. In some examples, the controller 50 can be configured to communicate via the Internet or any other suitable communication link 51. Although FIG. 3 shows one controller 50, there can be more than one controller 50. Portions of the methods described herein can be carried out by a single controller 50 or by several separate controllers 50. Each controller 50 can have one or more control sections or control units. In some examples, the controller 50 can include a computing system that includes a processing system, storage system, software, and input/output (I/O) interfaces (e.g. operator input device) for communicating with devices described herein and/or with other devices. The processing system can load and execute software from the storage system. The controller 50 may include one or many application modules and one or more processors, which may be communicatively connected. The processing system may comprise a microprocessor and other circuitry that retrieves and executes software from the storage system. Non-limiting examples of the processing system include general purpose central processing units, applications specific processors, and logic devices. The storage system can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 50 communicates with one or more components of the cooling system 10 via one or more communication links 51, which can be a wired or wireless links. The controller 50 is capable of monitoring and/or controlling one or more operational characteristics of the cooling system 10 and its various subsystems by sending and receiving control signals via the communication links 51. It should be noted that the extent of connections of the communication link 51 shown herein is for schematic purposes only, and the communication links 51 in fact provides communication between the controller 50 and each of the devices and various subsystems described herein, although not every connection is shown in the drawing for purposes of clarity Referring to FIG. 2, the cooling system 10 includes an outlet valve 60 that dispenses the beverage 8 from the cooling channel 12. The outlet valve 60 can be manually opened and/or closed. In another example, the outlet valve 60 is selectively controlled by the controller 50 (see FIG. 3) based on an input received by the operator input device 40. The cooling system 10 includes a pump 62 upstream of the cooling channels 12. The pump 62 is configured to pressurize the freshly brewed, or otherwise prepared, beverage 8. The controller 50 controls the pump 62 based on an input received by the operator input device 40 and the pressurized brewed beverage 8 is conveyed to the cooling channels 12 or inlet manifold 30 based on an input received by the operator input device 40 (see FIG. 3). The cooling system 10 includes a check or one-way valve 64 located downstream of the pump 62.

Figure 4:
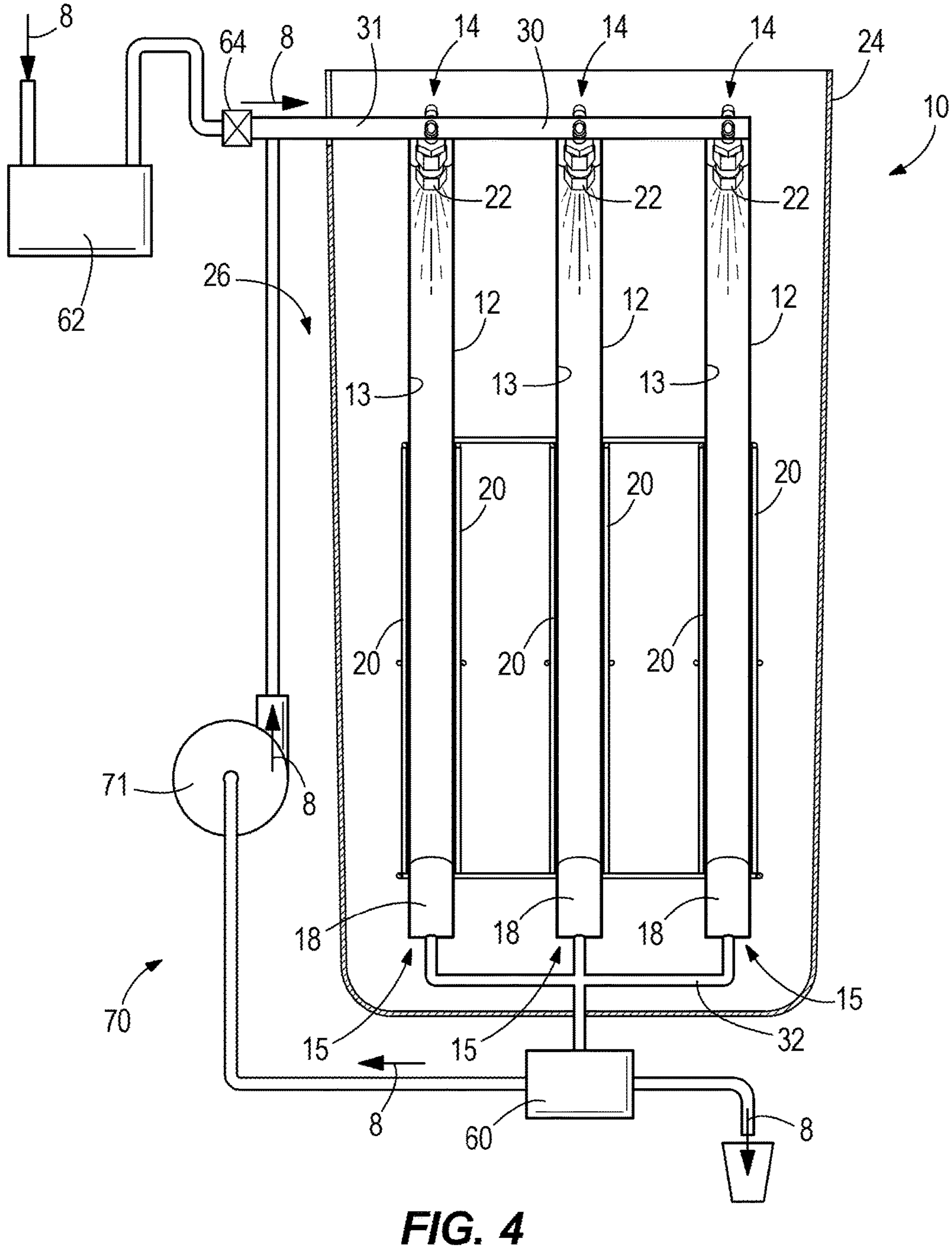
FIG. 4 is an example cooling system with a beverage recirculation system.

Referring to FIG. 4, the cooling system 10 includes a beverage recirculation system 70 that circulates the beverage 8 from the downstream outlet 15 of the cooling channel 12 to the upstream inlet 14 of the cooling channel 12. The beverage recirculation system 70 is coupled to the outlet valve 60. The beverage recirculation system 70 includes a pump 71. The controller 50 controls the pump 71 based on an input received by the operator input device 40 such that beverage 8 is circulated to the upstream inlet 14 of the cooling channels 12 (see FIG. 3). The beverage recirculation system 70 is configured to recirculate the beverage 8 through the cooling channels 12 such that the beverage 8 is further cooled by the cooling channels 12 (i.e. the beverage 8 is cooled multiple times by the cooling channels 12).

Figure 5:
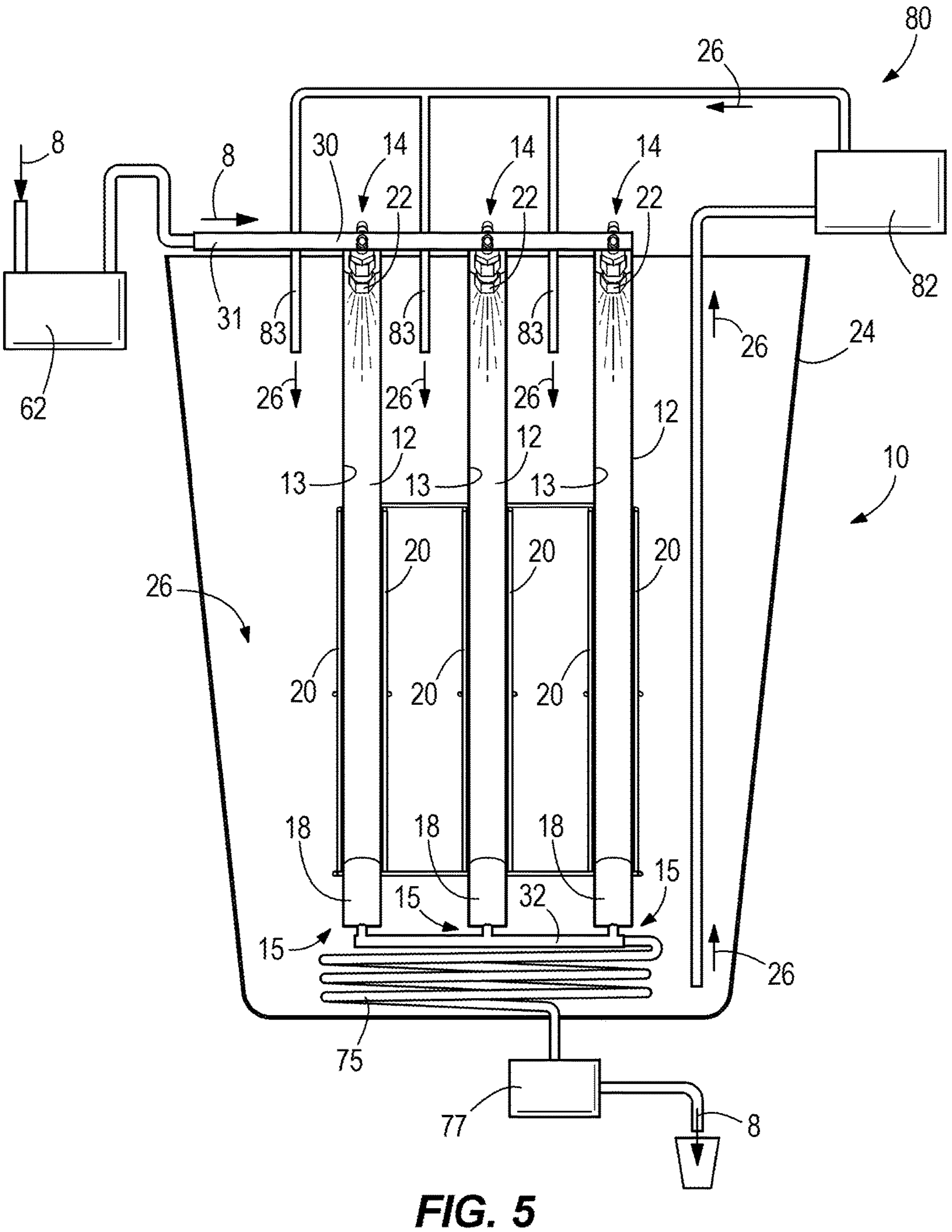
FIG. 5 is an example cooling system including a cooling media recirculation system and a post-chill coil.
Figure 6:
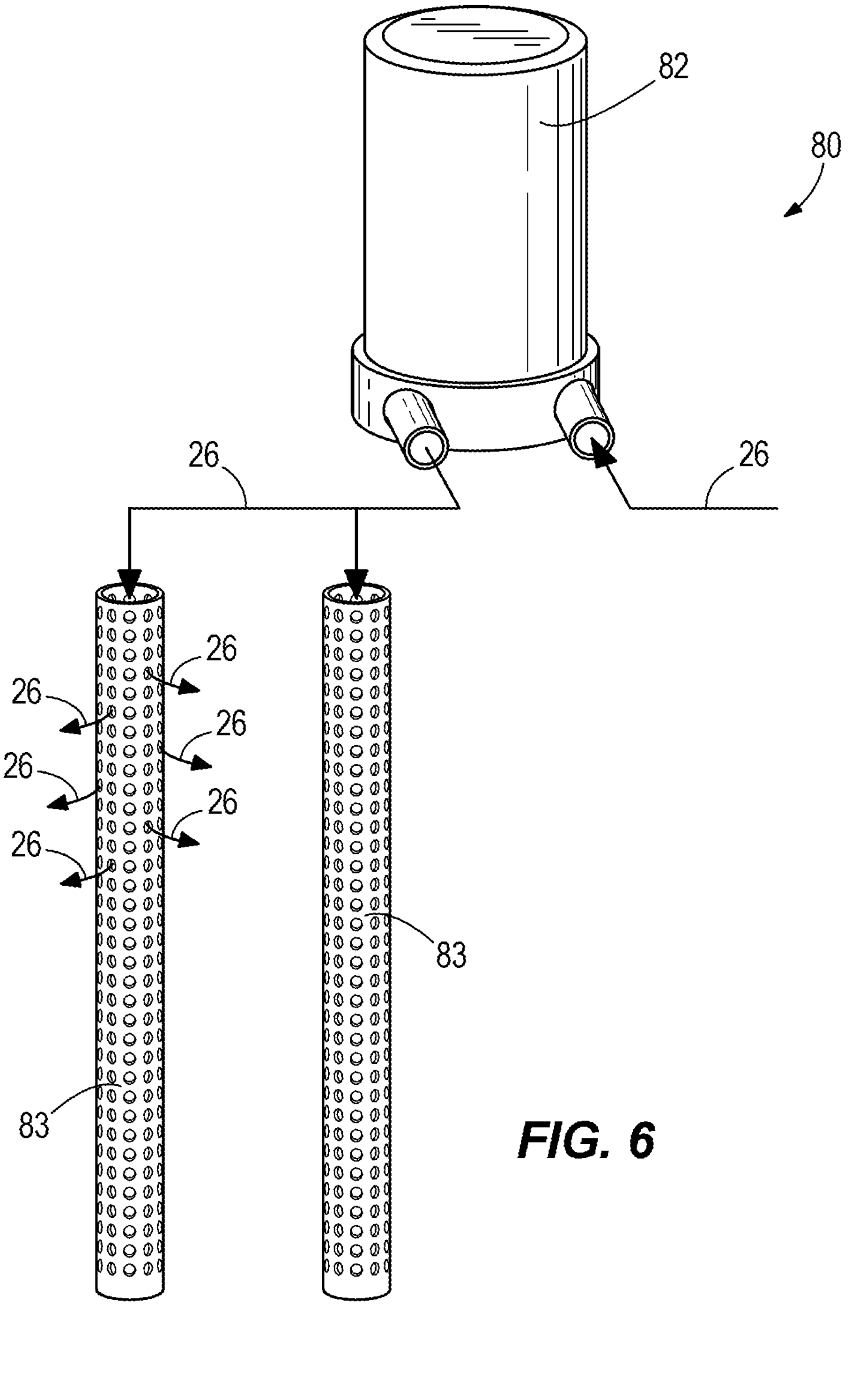
FIG. 6 is an example cooling media recirculation system including a pair of perforated tubes

Referring to FIG. 5, the cooling system 10 includes a post-chill coil 75 for cooling the beverage 8 downstream of the cooling channel 12. The post-chill coil 75 is located in the tank 24 such that the cooling media 26 cools the post-chill coil 75. The cooling system 10 includes a pump 77 configured to pull the beverage 8 from the post-chill coil 75 such that the beverage is dispensed through the outlet valve 60 to the operator. The controller 50 controls the pump 77 based on an input received by the operator input device 40 such that the beverage 8 is pulled through the post-chill coil 75 (see FIG. 3).

The cooling system 10 includes a cooling media circulation system 80 configured to circulate the cooling media 26 in the tank 24 (flow arrows on FIG. 5 which depict the flow path of the cooling media 26). The cooling media circulation system 80 includes a pump 82 for circulating the cooling media 26 and a perforated tube 83 configured to distribute the circulated cooling media 26 into the tank 24 (see also FIG. 6; flow arrows on FIG. 6 which depict the flow path of the cooling media 26). The controller 50 controls the pump 82 of the cooling media circulation system 80 based on an input received by the operator input device 40 and/or a cooling module or program configured to maintain a consistent temperature of cooling media 26 in the tank 24 (see FIG. 3) based on signals from a temperature monitoring system 95 having a plurality of sensors (not shown) that are configured to sense the temperature of the cooling media 26. The temperature monitoring system 95 can provide real-time feedback to the controller 50 pertaining to the temperature of the cooling media 26 such that the cooling system 10 operates the cooling media circulation system 80 to maintain the temperature of the cooling media 26.

Figure 7:
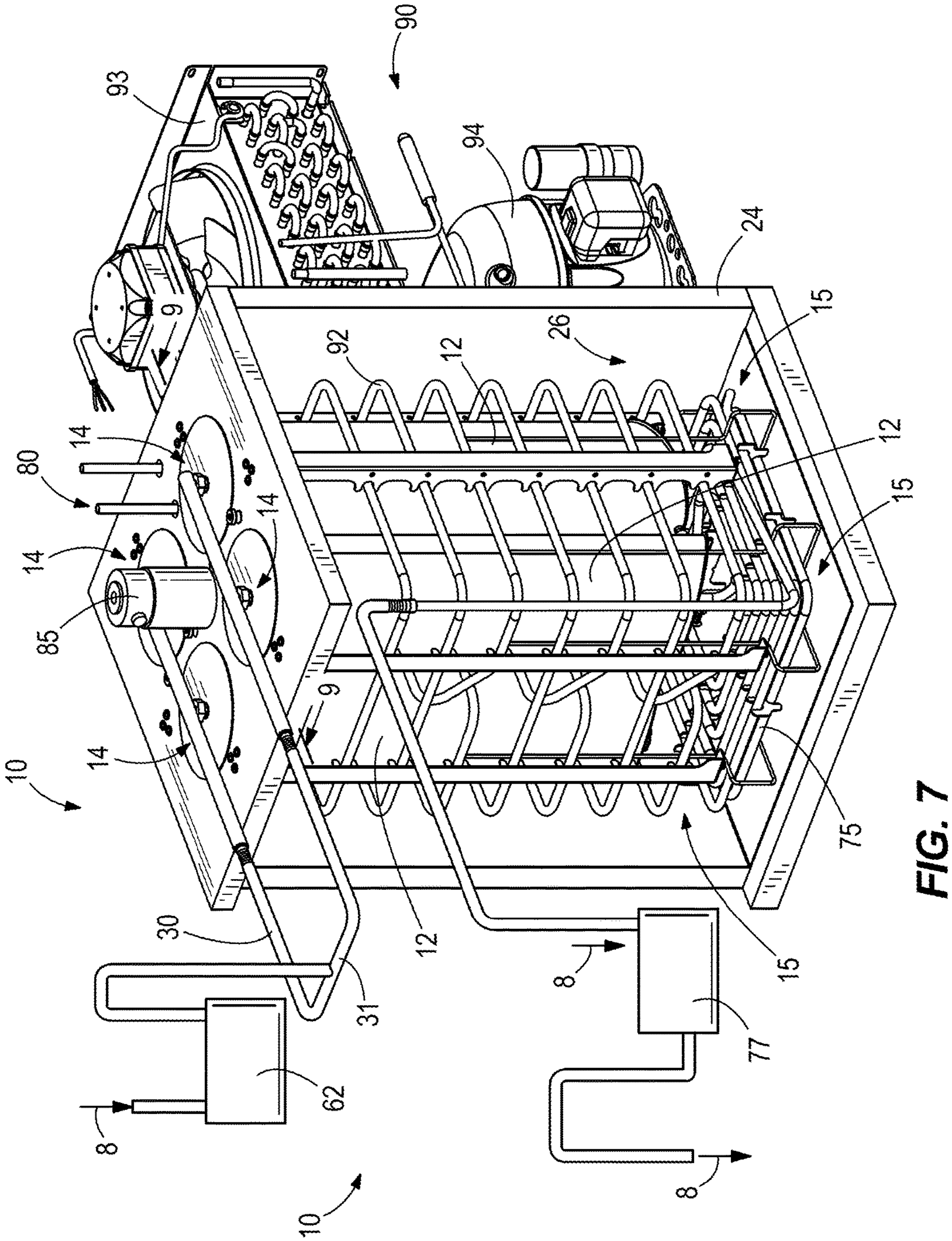
FIG. 7 is an example cooling system including a post-chill coil and a cooling media refrigeration system.
Figure 8:
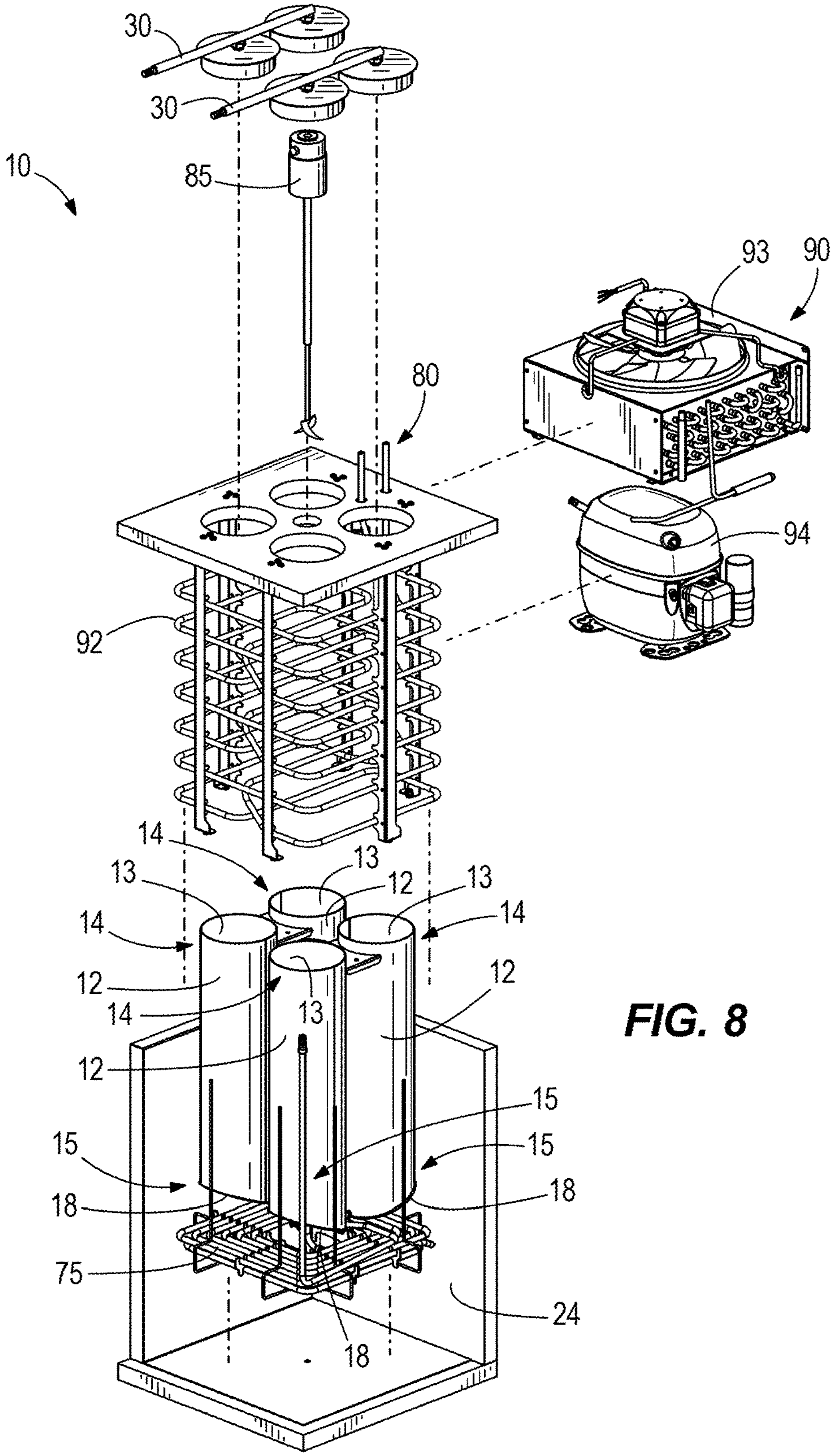
FIG. 8 is an exploded view of the example cooling system shown in FIG. 5.
Figure 9:
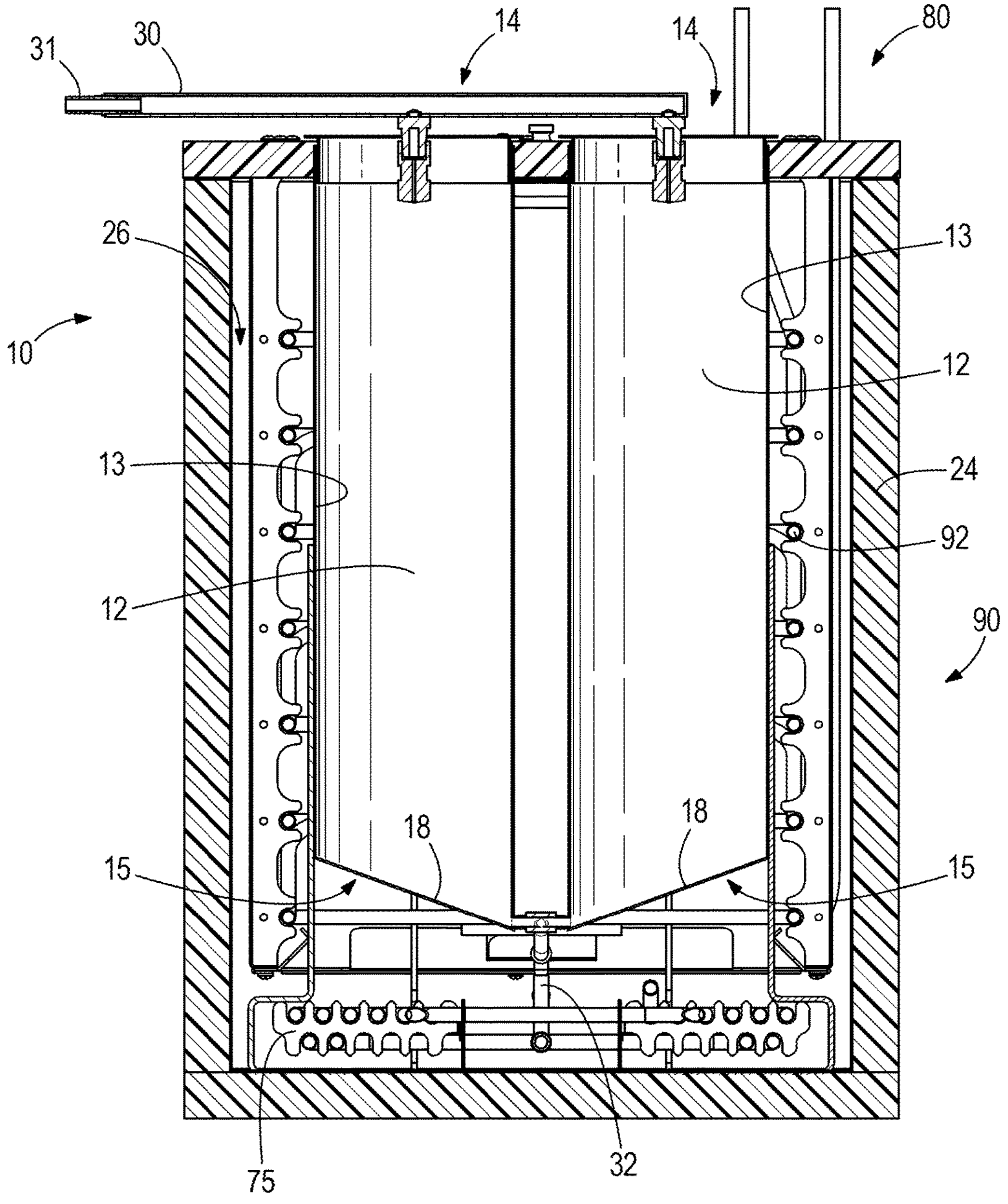
FIG. 9 is a cross-section view of the example cooling system of FIG. 5.

Referring to FIGS. 7-9, the cooling system 10 includes a cooling media refrigeration system 90 configured to convey a refrigerant that exchanges heat with the cooling media 26. The cooling media refrigeration system 90 includes an evaporator coil 92 located in the tank 24 such that the cooling media 26 exchanges heat with the refrigerant, a condenser 93, and a compressor 94. In certain examples, the cooling media refrigeration system 90 is a vapor compression refrigeration system (VCRS). The controller 50 controls the cooling media refrigeration system 90 based on an input received by the operator input device 40 and/or a cooling module or program configured to maintain a consistent temperature of cooling media 26 in the tank 24 (see FIG. 3). The cooling system 10 includes an agitator 85 and/or a cooling media recirculation system 80 configured to agitate the cooling media 26 in the tank 24. The controller 50 controls the agitator 85 and/or a cooling media recirculation system 80 (see FIG. 3). The cooling media refrigeration system 90 can be operated based on the temperature sensed by the sensors (not shown) of the temperature monitoring system 95 (see FIG. 3). The temperature monitoring system 95 in connected to the controller 50. The controller 50 can alarm or notify the operator (via the operator input device 40 or visual/audio indicator 44) when the temperature monitoring system 95 relays a signal that the temperature the cooling media 26 in the tank 24 is elevated above a certain level (see FIG. 3). The cooling media refrigeration system 90 can be operated to maintain the temperature of the cooling media 26 and/or the operator may add ice to the tank 24 to quickly change the temperature of the cooling media 26. The refrigerant can be any acceptable heat transfer fluid including but not limited to water, glycol, phase change material (PCM), and/or the like.

Figure 10:
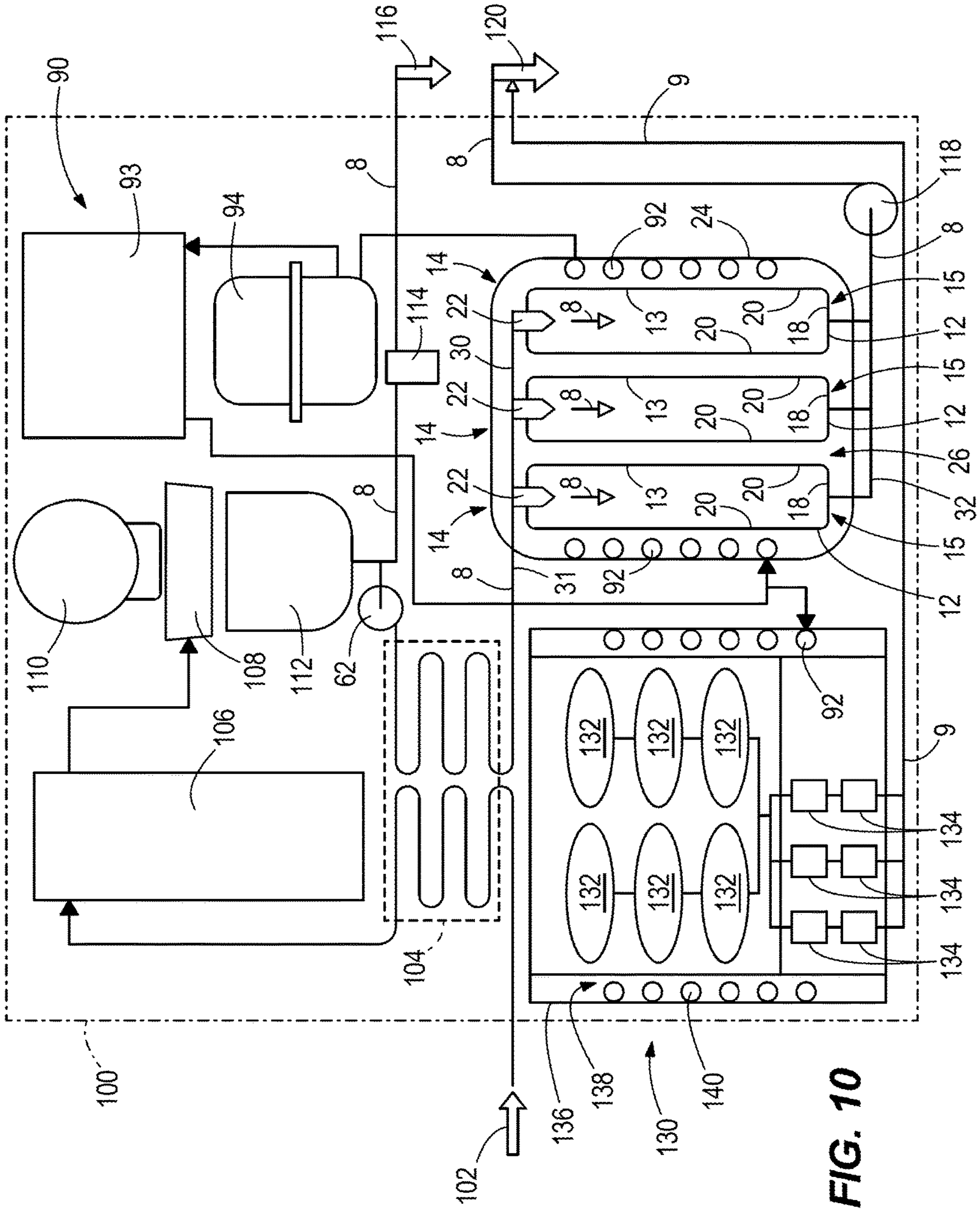
FIG. 10 is an example beverage machine.
Figure 11:
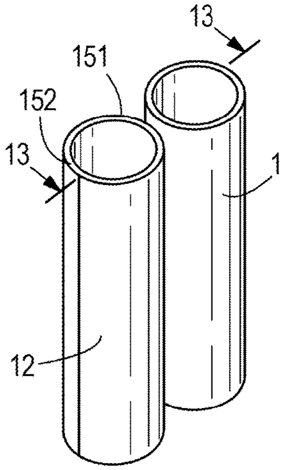
FIG. 11 is a perspective view of two double-walled cooling channels.
Figure 12:
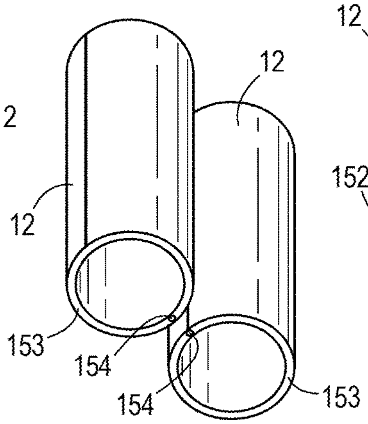
FIG. 12 is a perspective view of the cooling channels of FIG. 11.
Figure 13:
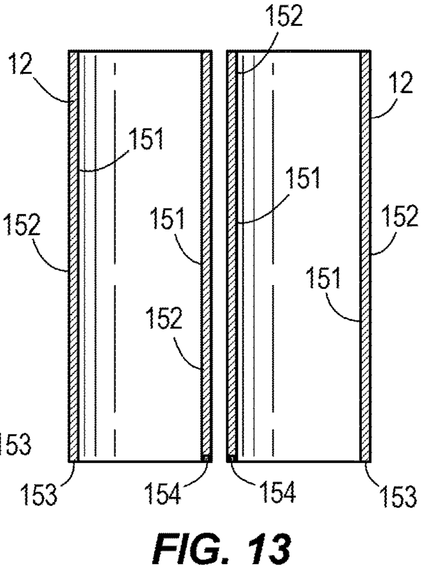
FIG. 13 is a cross-section view of the cooling channels of FIG. 11 along line 13-13 depicted in FIG. 11.
Figure 14:
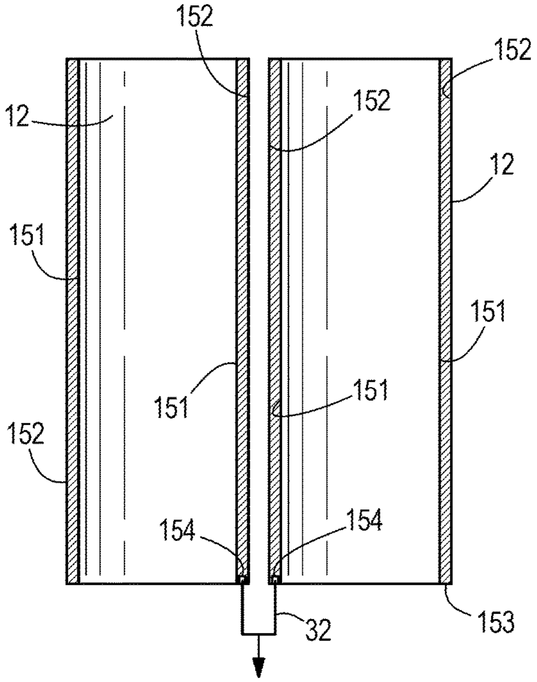
FIG. 14 is a cross-section view of the cooling channels of FIG. 11 along line 13-13 depicted in FIG. 12 with an outlet manifold.
Figure 15:
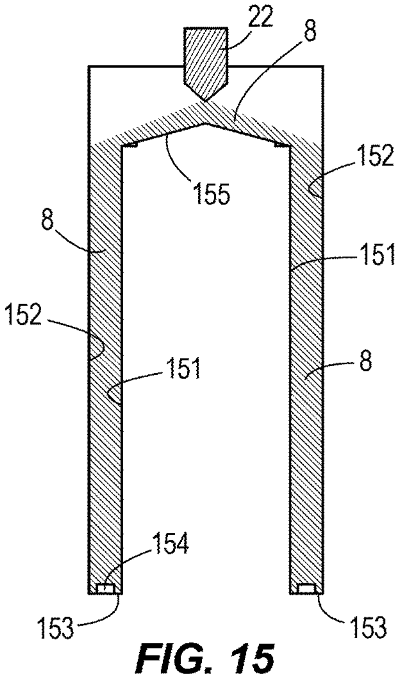
FIG. 15 is a cross-section view of an example double-walled cooling channel.

Referring to FIG. 10, a beverage machine 100 is depicted. The beverage machine 100 includes the cooling system 10 and other components described herein. The controller 50 can control the components of the beverage machine described herein 100 based on an input received by the operator input device (see FIG. 3).

The beverage machine 100 includes a water inlet 102 configured to receive water from a water source (not shown). The water received by the water inlet 102 is conveyed through a water heat exchanger 104 (discussed further herein) to a boiler 106 which heats the water. The water is conveyed to a beverage brewer 108 which is configured to receive a powdered beverage mix and/or grinds from a seed grinder 110. The water conveys through the beverage brewer 108 by gravity to a beverage collector 112 which collects a hot brewed beverage (see the beverage 8 depicted in FIG. 10) which comprises the hot water and flavoring from the grinds and/or the powdered beverage. The hot brewed beverage is conveyed by a hot beverage pump 114 to a hot beverage dispense valve 116 which is configured to selectively dispense the hot brewed beverage to the operator. Alternatively, the hot brewed beverage can be conveyed by the pump 62 to be cooled by the cooling system 10 (as described above). The pump 62 conveys the hot brewed beverage to the cooling system 10 through the water heat exchanger 104 such that the hot brewed beverage exchanges heat with the water conveying to the boiler 106. The hot brewed beverage is conveyed by the inlet manifold 30 to each of the cooling channels 12 where each nozzle 22 sprays the hot brewed beverage onto the inner peripheral surfaces 13 of each cooling channel 12. The cooling channel 12 cools the hot brewed beverage and the outlet manifold 32 collects the cooled beverage. A cooled beverage pump 118 pulls the cooled beverage from the outlet manifold 32 and conveys the cooled beverage to a multi-flavor valve 120 that is configured to receive the cooled brewed beverage and receive additives 9 from an additive system 130 (described further herein). The multi-flavor valve 120 is configured to selectively dispense the cooled brewed beverage with or without at least one additive 9.

The additive system 130 is configured to supply at least one additive 9 (e.g. flavoring, color) (see flow of additive 9 on FIG. 10) to the multi-flavor valve 120. The additive system 130 includes at least one bag-in-the-box (BIB) additive source 132 that contain the additive 9. The additive source 132 is coupled to a flavor pump 134 configured to convey the additive 9 from the additive source 132 and convey the additive 9 to the multi-flavor valve 120. The controller 50 controls the flavor pumps 134 based on an input received by the operator input device 40. The additives and/or flavors are dispensed with the beverage at the multi-flavor valve 120. The additive system 130 includes a tank 136 configured to contain a cooling media 138. The additive source 132 is located in the tank 136 such that the cooling media 138 cools the additive source 132. The additive system 130 includes a refrigerant coil 140 in the tank 136 that is configured to convey a refrigerant such that the cooling media 138 exchanges heat with the refrigerant. The evaporator coil 92 is coupled the condenser 93 and the compressor 94.

The present disclosure thus provides example methods for rapidly cooling a beverage 8 including supplying the beverage 8 to the cooling channel 12 having an inner peripheral surface 13; spraying the beverage 8 through a nozzle 22 onto the inner peripheral surface 13 of the cooling channel 12; conveying the beverage 8 by gravity along the inner peripheral surface 13 of the cooling channel 12 such that the beverage 8 is cooled by condensation and convection; conveying the beverage 8 from the inner peripheral surface 13 by gravity along a lower surface 18 to a downstream outlet 15 of the cooling channel 12; locating the cooling channel 12 in a tank 24 configured to contain a cooling media 26; and conveying the beverage 8 through a post-chill coil 75 configured to cool the beverage.

Certain examples of the cooling system cool the beverage from 190 degrees Fahrenheit down to less than or equal to 40 degrees Fahrenheit. Certain examples of the tank include a lid to prevent heat infiltration. Certain examples of the inlet manifold include a cover assembly configured to cover the cooling channels and/or the tank. Certain examples of the cooling system can cool each beverage of a plurality of beverages at the same time such that each of a plurality of manifolds convey a separate beverage and each of a plurality of cooling channels cools each beverage of a plurality of beverages, respectively. Certain examples of the cooling system include a plurality of post-chill coils each configured to cool each beverage of a plurality of beverages and a plurality of pumps each configured to pull each beverage of the multiple beverages through each of the plurality of post-chill coils. Certain examples of the cooling system allow an operator to dispense the beverage manually. Certain examples of the cooling system includes a display (e.g. touch screen, LCD display) configured to display status of the temperature in the tank. Certain examples the nozzle has a spray pattern (e.g. solid stream, hollow cone, full cone, flat spray, multiple plume spray) for spraying the beverage. Certain examples of the cooling system include a nozzle configured to spray a beverage onto cooling channel such that the beverage sprays in droplets that transfer heat to the cooling channel wherein droplets accumulate to form a laminar flow profile on the cooling channel Through research and experimentation, the present inventors have determined that the number of cooling channels included with the cooling system proportionately affects a drink dispense rate required at the outlet (e.g. six cooling channels are included when the drink dispense rate at the outlet is high (i.e. high drink dispense rate); two cooling channels are included when the drink dispense rate at the outlet is low (i.e. low drink dispense rate)).

The present disclosure provides example methods for rapidly cooling a beverage including brewing a hot beverage in a brewer; pumping the hot beverage to nozzles; spraying the hot beverage into the cooling channel such that the hot beverage is atomized into very fine droplets which collide against the walls of the cooling channel and accumulate; dispensing a cold beverage by gravity from the cooling channel; and receiving the cold beverage in a cup. In certain examples, the method includes recirculating the beverage such that the beverage is further cooled by the cooling channels.

What is claimed is:

1. A cooling system for rapidly cooling a beverage, the cooling system comprising:

a tank containing a cooling media;

a plurality of cooling channels submerged in the cooling media in the tank, each cooling channel having an upstream inlet configured to receive the beverage, a downstream outlet configured to dispense the beverage, and an inner peripheral surface along which the beverage is conveyed by gravity between the upstream inlet and the downstream outlet; and a plurality of nozzles, each nozzle configured to spray the beverage onto the inner peripheral surface of one of the plurality of cooling channels, wherein the plurality of cooling channels are each directly submerged in the cooling media such that the cooling media directly contacts the plurality of cooling channels so that heat is exchanged between the cooling media and the beverage, and wherein the beverage is cooled as the beverage condenses on the inner peripheral surface of each of the plurality of cooling channels and is conveyed by gravity along the inner peripheral surface of each of the plurality of cooling channels.

2. The cooling system according to claim 1, wherein the plurality of nozzles are configured to reduce the pressure of the beverage such that the beverage expands and cools.

3. The cooling system according to claim 1, wherein the plurality of cooling channels are cylinders.

4. The cooling system according to claim 1, further comprising an inlet manifold coupled to the plurality of cooling channels configured to convey the beverage to the upstream inlets.

5. The cooling system according to claim 4, further comprising an outlet manifold coupled to the plurality of cooling channels and configured to collect the beverage dispensed from the downstream outlets.

6. The cooling system according to claim 1, further comprising a cooling media circulation system that circulates the cooling media in the tank.

7. The cooling system according to claim 6, wherein the cooling media circulation system has a perforated tube that distributes the cooling media in the tank.

8. The cooling system according to claim 1, further comprising an agitator that agitates the cooling media in the tank.

9. The cooling system according to claim 8, further comprising a cooling media refrigeration system configured to convey a refrigerant that exchanges heat with the cooling media, wherein the cooling media refrigeration system has a refrigerant coil through which the refrigerant is conveyed, and wherein the refrigerant coil is located in the tank such that cooling media exchanges heat with the refrigerant via the refrigerant coil.

10. The cooling system according to claim 6, further comprising a post-chill coil located in the tank and configured to receive the beverage from the downstream outlets, wherein the beverage is further cooled as heat is transferred from the beverage to the cooling media via the post-chill coil.

11. The cooling system according to claim 1, further comprising an operator input device and a controller that controls the cooling system according to an input from the operator input device.

12. The cooling system according to claim 11, further comprising an outlet valve that dispenses the beverage conveyed by the cooling channel, wherein the controller controls the outlet valve to dispense the beverage according to an input from the operator input device.

13. The cooling system according to claim 1, further comprising a beverage recirculation system that circulates the beverage from the downstream outlets to the upstream inlets such that the beverage is further cooled by the cooling channel.

14. A method of rapidly cooling a beverage, the method comprising:

locating a plurality of cooling channels within cooling media contained in a tank, wherein each cooling channel has an upstream inlet that receives the beverage, a downstream outlet that dispenses the beverage, and an inner peripheral surface;

supplying the beverage to the plurality of cooling channels;

spraying, with a plurality of nozzles, the beverage into each of the plurality of cooling channels, wherein each nozzle in the plurality of nozzles sprays the beverage onto the inner peripheral surface of one of the plurality of cooling channels, wherein the plurality of cooling channels are each directly submerged in the cooling media such that the cooling media directly contacts the plurality of cooling channels so heat is exchanged between the cooling media and the beverage, and wherein the beverage is cooled by condensation and as the beverage is conveyed by gravity along the inner peripheral surface of each of the plurality of cooling channels.

15. The method according to claim 14, further comprising conveying the beverage through a post-chill coil located in the tank, wherein the post-chill coil receives the beverage from the downstream outlets such that the beverage is further cooled as heat is transferred from the beverage to the cooling media via the post-chill coil.

16. A cooling system for rapidly cooling a beverage, the cooling system comprising:

a tank having a tank sidewall and an interior space containing a cooling media;

a cooling channel positioned in the tank such that the cooling channel is submerged in the cooling media, the cooling channel having an upstream inlet configured to receive the beverage, a downstream outlet configured to dispense the beverage, and a channel sidewall having an inner peripheral surface along which the beverage is conveyed by gravity between the upstream inlet of the cooling channel and the downstream outlet of the cooling channel and an opposing, exterior surface is in direct contact with the cooling media, wherein the channel sidewall and the tank sidewall are spaced apart from each other and define a gap in which the cooling media resides; and a nozzle configured to spray the beverage onto the inner peripheral surface such that the beverage is cooled as heat is transferred from the beverage to the cooling media through the channel sidewall as the beverage is conveyed by gravity along the inner peripheral surface.

17. The cooling system according to claim 16, wherein the cooling channel is one of a plurality of cooling channels, wherein the plurality of cooling channels are positioned in the tank in a parallel arrangement relative to each other, wherein the nozzle is one of a plurality of nozzles, and wherein the plurality of nozzles are configured to spray the beverage into the plurality of cooling channels and onto the inner peripheral surface of each of the plurality of cooling channels.

18. The cooling system according to claim 17, further comprising an inlet manifold configured to distribute a single beverage flow to the plurality of cooling channels such that the single beverage flow is rapidly cooled by the plurality of cooling channels.

19. The cooling system according to claim 16, wherein each cooling channel in the plurality of cooling channels has a lower surface positioned vertically directly below the inner peripheral surface along which the beverage is further conveyed by gravity from the inner peripheral surface to the downstream outlet.

* * * * *